United States Patent
Tagesson et al.

(10) Patent No.: US 9,573,589 B2
(45) Date of Patent: *Feb. 21, 2017

(54) METHOD AND ARRANGEMENT FOR VEHICLE STABILIZATION

(75) Inventors: Kristoffer Tagesson, Göteborg (SE); Leo Laine, Härryda (SE); Sogol Kharrazi, Linköping (SE)

(73) Assignee: Volvo Lastvagnar AB, Göteborg (SE)

( * ) Notice: Subject to any disclaimer, the term of this patent is extended or adjusted under 35 U.S.C. 154(b) by 205 days.

This patent is subject to a terminal disclaimer.

(21) Appl. No.: 14/354,568

(22) PCT Filed: Oct. 31, 2011

(86) PCT No.: PCT/SE2011/000193
§ 371 (c)(1),
(2), (4) Date: Oct. 29, 2014

(87) PCT Pub. No.: WO2013/066215
PCT Pub. Date: May 10, 2013

(65) Prior Publication Data
US 2015/0367844 A1 Dec. 24, 2015

(51) Int. Cl.
*B60W 30/02* (2012.01)
*B60T 8/1755* (2006.01)
(Continued)

(52) U.S. Cl.
CPC ............ *B60W 30/02* (2013.01); *B60T 8/1708* (2013.01); *B60T 8/1755* (2013.01); *B60W 10/18* (2013.01);
(Continued)

(58) Field of Classification Search
CPC ... B60W 30/02; B60W 40/109; B60W 40/114; B60W 40/10; B60W 40/12; B60W 40/13; B60W 2300/14; B60W 10/18; B60W 10/20; B60W 2520/14; B60W 13/005; B60W 13/862; B60W 13/04; B60W 13/025; B62D 13/005; B62D 13/04; B62D 13/025; B62D 13/00; B60D 1/30; B60T 8/1708; B60T 8/1755; B60T 2230/06; B60T 2260/02; B60Y 2200/148
See application file for complete search history.

(56) References Cited

U.S. PATENT DOCUMENTS 3,948,567 A 4/1976 Kasselmann et al.
4,345,775 A 8/1982 Merrifield
(Continued)

FOREIGN PATENT DOCUMENTS

DE 10048418 A1 4/2002
DE 102008028981 A1 12/2009
(Continued)

OTHER PUBLICATIONS

Md. Manjurul Islam, Design Synthesis of Articulated Heavy Vehicles with Active Trailer Steering Systems, A thesis presented to the University of Ontario Institute of Technology, Oshawa, Ontario, Canada, 2010, Md. Manjurul Islam 2010, pp. i-xv, 1-110.*
(Continued)

*Primary Examiner* — Thomas G Black
*Assistant Examiner* — Sze-Hon Kong
(74) *Attorney, Agent, or Firm* — WRB-IP LLP

(57) ABSTRACT

An arrangement for improving stability of a vehicle combination including a towing vehicle and at least one towed vehicle, where the at least one towed vehicle includes at least one actively steered axle and/or individual brake on at least one axle, where the towing vehicle and the at least one towed vehicle each includes an arrangement for determining yaw rate for determining the yaw rate of the vehicle and the at least one towed vehicle, where the arrangement further (Continued)

includes a vehicle combination model adapted for determining a desired delay value between the yaw rate of the towing vehicle and the yaw rate of the at least one towed vehicle, where the arrangement is adapted to stabilize the at least one towed vehicle by using the determined yaw rate of the towing vehicle and the desired delay value for the at least one towed vehicle to establish a desired yaw rate for the at least one towed vehicle, and to control the steered axle and/or the individual brake of the at least one towed vehicle such that the determined yaw rate of the at least one towed vehicle corresponds to the desired yaw rate of the at least one towed vehicle. The yaw rate may be estimated or measured. The advantage of the invention is that the stability of a vehicle combination can be improved, which in turn improves the road safety.

15 Claims, 3 Drawing Sheets

(51) Int. Cl.
    *B60T 8/17*          (2006.01)
    *B62D 13/00*       (2006.01)
    *B60W 10/18*       (2012.01)
    *B60W 10/20*       (2006.01)

(52) U.S. Cl.
    CPC .............. *B60W 10/20* (2013.01); *B62D 13/00* (2013.01); *B60T 2230/06* (2013.01); *B60T 2260/02* (2013.01); *B60W 2520/14* (2013.01); *B60Y 2200/148* (2013.01)

(56) References Cited

U.S. PATENT DOCUMENTS

| | | | |
|---|---|---|---|
| 5,607,028 A | 3/1997 | Braun et al. | |
| 5,747,683 A * | 5/1998 | Gerum ................ | G05B 13/042 701/72 |
| 6,223,114 B1 | 4/2001 | Boros et al. | |
| 6,498,977 B2 | 12/2002 | Wetzel et al. | |
| 6,655,710 B2 | 12/2003 | Lindell et al. | |
| 7,925,409 B2 * | 4/2011 | Fry ....................... | B60T 8/1708 180/14.6 |
| 2003/0158641 A1 * | 8/2003 | Dickinson ............... | B62D 7/159 701/41 |
| 2004/0080209 A1 * | 4/2004 | Leimbach ............. | B60T 8/1755 303/146 |
| 2005/0060082 A1 | 3/2005 | Heuer et al. | |
| 2005/0206229 A1 | 9/2005 | Lu et al. | |
| 2005/0206231 A1 | 9/2005 | Lu et al. | |
| 2005/0206235 A1 | 9/2005 | Tseng | |
| 2006/0129298 A1 * | 6/2006 | Takeda ................ | B60T 8/17554 701/70 |
| 2006/0173584 A1 * | 8/2006 | Einig .................... | B60T 8/1708 701/1 |
| 2006/0204347 A1 * | 9/2006 | Waldbauer ................ | B60T 7/20 410/156 |
| 2006/0206253 A1 | 9/2006 | Yu et al. | |
| 2007/0179735 A1 * | 8/2007 | Fiedler ................ | B60R 21/0132 702/150 |
| 2007/0255475 A1 * | 11/2007 | Dagh ........................ | B60T 8/00 701/71 |
| 2007/0260384 A1 * | 11/2007 | Romanchok .......... | B60T 8/1708 701/70 |
| 2007/0260386 A1 | 11/2007 | Tandy, Jr. et al. | |
| 2008/0172163 A1 * | 7/2008 | Englert ..................... | B60T 7/20 701/83 |
| 2008/0177454 A1 * | 7/2008 | Bond ..................... | B60T 8/1755 701/70 |
| 2009/0005946 A1 * | 1/2009 | Futamura .............. | B60T 8/1708 701/70 |
| 2009/0198425 A1 * | 8/2009 | Englert .................... | B60D 1/30 701/70 |
| 2009/0210112 A1 * | 8/2009 | Waldbauer ............ | B60T 8/1708 701/42 |
| 2009/0228182 A1 * | 9/2009 | Waldbauer ............ | B60T 8/1708 701/70 |
| 2009/0236823 A1 * | 9/2009 | Prem ..................... | B62D 13/005 280/426 |
| 2010/0070149 A1 | 3/2010 | Fry et al. | |
| 2011/0202238 A1 * | 8/2011 | Cebon .................... | B62D 7/159 701/41 |
| 2012/0109471 A1 * | 5/2012 | Wu ........................ | B60T 8/1708 701/49 |
| 2013/0085649 A1 * | 4/2013 | Matoy ................... | B60T 8/1708 701/70 |

FOREIGN PATENT DOCUMENTS

| | | |
|---|---|---|
| DE | 102009011907 A1 | 9/2010 |
| WO | 0206101 A1 | 1/2002 |
| WO | 02053424 A1 | 7/2002 |

OTHER PUBLICATIONS

Bahaghighat et al., Predictive Yaw and Lateral control in Long Heavy Vehicles Combinations, 49th IEEE Conference on Decision and Control, Dec. 15-17, 2010, pp. 6403-6408.*
Wu et. al. "Analysis of dynamic lateral response for a multi-axle-steering tractor and trailer", Heavy Vehicle Systems, A Special issue of the Int. J. of Vehicle Design, vol. 10, No. 4, pp. 281-294.; abstract: p. 288; figures 1 ,4-6; Section 5, "Conclusions".
Banaghighat M.K et al "Predictive Yaw and Lateral Contol in Long Heavy Vehices Combnations", 49th IEEE Conference on Decision and Control, Dec. 15-17, 2010.; abstract figures 2, 4; Sections III, V.
Leine L. et al "Proposal for using Sine With Dwell on low friction for the evaluation of yaw stability for heavy vehicle combinations" IEEE International Conference on Vehicular Electronics and Safety, Sep. 22-24, 2008; abstract; figure 2; Section C.
International Search Report (Jun. 5, 2012) for corresponding International App. PCT/SE2011/00193.
International Preliminary Report on Patentability (Jan. 23, 2014) for corresponding International App. PCT/SE2011/000193.
Supplementary European Search Report (May 13, 2015) for corresponding European App. EP 11 87 5191.

* cited by examiner

METHOD AND ARRANGEMENT FOR VEHICLE STABILIZATION

BACKGROUND AND SUMMARY

The present invention relates to an arrangement and a method for stabilizing a vehicle combination comprising a towing vehicle and at least one towed vehicle. The arrangement and method is especially suited for vehicle combinations having more than one towed vehicle.

In order to reduce the number of heavy vehicles on the roads, longer vehicle combinations comprising more than one towed vehicle are proposed for the use on regular roads in some countries. Apart from reducing the required number of towing vehicles for a specific load, the energy consumption and the emission of exhaust gases will also be reduced compared with traditional vehicle combinations. Normally, the length and the weight of the vehicle combination are controlled by law and regulations. In some countries, longer and/or heavier vehicle combinations are already allowed under restricted conditions. Such vehicles may comprise several towed vehicles and may be over 50 meters long and more. They are often used in remote areas and for specific purposes. In Australia, road trains comprising more than 4 trailers are used in some states and on some roads. Longer combination vehicles (LCV's) are also used in e.g. USA, Canada and Argentina. All these LCV's are used under strict regulations.

Long vehicle combinations containing several towed vehicles are in general more instable than vehicles having one or a few towed vehicles at high speed. This means that long vehicle combinations are more prone to roll over, jack-knife, trailer swing out and to start skidding. On the other hand, long vehicle combinations are more transport efficient since their load capacity is higher.

One problem with a longer vehicle combination is the stability of the vehicle combination. Even with vehicle combinations having a single towed vehicle, such as a tractor trailer combination, stability problems may arise when braking or turning. One stability problem that may arise is that the trailer starts swinging from side to side. This may happen when the vehicle travels with a relatively high speed and changes lane or drives in curves. The stability of the vehicle combination will normally correct itself when the vehicle travels straight, but this may still affect the traffic around the vehicle, either by bumping in to other vehicles or by scaring drivers in the vicinity. Another type of stability problem arises when the vehicle combination brakes. One such problem is known as jackknifing, in which the trailer will spin around such that the tractor and trailer will resemble a folded pocket knife.

There are several ways of improving the stability of a vehicle combination in order to avoid accidents. Solutions reducing the turning angle for the trailer have been proposed, unsuccessfully. Anti-lock brakes and electronic brake force distribution controlled by an electronic control unit has reduced some types of accidents. Such solutions are mostly designed for a vehicle combination having a single trailer. For a longer vehicle combination having several towed vehicles, the proposed solutions will not suffice.

US 2010/070149 describes a trailer electronic braking system for a road train having a tractor and a plurality of trailers. The braking system includes a braking ECU on each trailer and a communication interface being provided so that the braking ECU on a first trailer and the braking ECU on a second trailer are able to communicate with one another. In use, the respective braking ECU on the first and second trailer receive an input from a respective sensor on the first and second trailer adapted to detect lateral acceleration and/or wheel speed. In the event that one of the sensors detects lateral acceleration and/or a wheel speed indicative of a loss of stability, the sensor generates a signal for actuating stability control, which signal is passed via the communication interface to the braking ECU on the other trailer, so that the other trailer can actuate stability control.

This system is adapted to measure the actual lateral acceleration or wheel speed of a trailer. If the ECU of one trailer detects a predefined condition indicative of a stability problem, a signal is sent to the ECU of the other trailer, such that the ECU of the other trailer can actuate the brakes of that trailer. This system is thus adapted to control actual, measured conditions when they already have occurred.

WO 2010087022 describes a behaviour controller of a vehicle combination (tractor+trailer/semi trailer) for preventing a jack-knife phenomenon while taking account of a fact that relative rotary action of the trailer and tractor changes according to the vehicle speed or the magnitude of deceleration. The controller comprises a brake force/drive force control section for controlling the brake force/drive force of a tractor or a trailer so as to reduce the difference in yaw rate between the tractor and the trailer. The brake force is controlled when the size of deviation of yaw rate of the tractor and yaw rate of the trailer exceeds a specified threshold. The brake force of each tractor or trailer wheel can be controlled independently.

This system is adapted to measure the actual rotary action between a tractor and a single trailer. This system is thus adapted to control actual, measured conditions when they already have occurred.

In some cases, there may however be an advantage in predicting the movement of the towed vehicles in advance in order to limit the swaying or swinging of the towed vehicles during e.g. a lane change. There is thus still room for improvements.

It is desirable to provide an arrangement for improving stability of a vehicle combination comprising a towing vehicle and at least one towed vehicle. It is also desirable to provide a method for improving stability of a vehicle combination comprising a towing vehicle and at least one towed vehicle.

In an arrangement for improving stability of a vehicle combination comprising a towing vehicle and at least one towed vehicle, where the at least one towed vehicle comprises at least one actively steered axle and/or an individual brake on at least one axle, where the towing vehicle and the at least one towed vehicle each comprises a yaw rate determining means for determining the yaw rate of the vehicle and the at least one towed vehicle, where the arrangement further comprises a vehicle combination model adapted for determining a desired delay value between the yaw rate of the towing vehicle and the yaw rate of the at least one towed vehicle, the problem is solved in that the arrangement is adapted to stabilize the at least one towed vehicle by using the determined yaw rate of the towing vehicle and the desired delay value for the at least one towed vehicle to establish a desired yaw rate for the at least one towed vehicle, and to control the steered axle and/or the individual brake of the at least one towed vehicle such that the determined yaw rate of the at least one towed vehicle corresponds to the desired yaw rate of the at least one towed vehicle.

By this first embodiment of the arrangement, the arrangement will determine the actual yaw rate of the towing vehicle. The arrangement further comprises a vehicle combination model adapted for determining a desired delay value between the yaw rate of the towing vehicle and the yaw rate of each towed vehicle. By applying this delay value to the yaw rate value of each towed vehicle, each towed vehicle will behave similar to the towing vehicle. The stability of the towed vehicles can thus be improved.

The yaw rate of the towing vehicle can be determined either by estimation or by a measurement. The estimation may be done by using an estimation method based on vehicle combination properties, such as wheel speed of the vehicle, vehicle mass, vehicle length, steering angle etc. Yaw rate measurements are done by using a yaw rate sensor.

In an advantageous development of the inventive arrangement, the amplitude of the desired yaw rate of the at least one towed vehicle and the amplitude of the determined yaw rate of the towing vehicle are proportional when carrying out a manouvre. The ratio between the amplitude values is preferably selected such that the ratio is close to 1, and is preferably in the range between 0.9-1.2. In this way, the damping of the yaw rate for the towed vehicles will improve the stability of the vehicle combination.

It is possible to use a deadband during the stabilizing of the vehicle combination when comparing the determined yaw rate with the reference yaw rate. In this way, small unnecessary adjustments of the vehicle combination are avoided when the vehicle combination travels on a straight road or behaves naturally as desired. Even when a vehicle combination travels straight, the towed vehicles may sway slightly sideways. By using a deadband, there will be no stabilizing of the vehicle combination for small sideways movements in this case. This is especially advantageous when the stabilizing actuators are wheel brakes, since the brakes do not have to be actuated constantly.

In a method for stabilizing a vehicle combination comprising a towing vehicle and at least one towed vehicle, the steps of establishing a desired delay value for the yaw rate between the towing vehicle and the at least one towed vehicle in the vehicle combination by using a vehicle combination model, determining the yaw rate of the towing vehicle, establishing a desired yaw rate value for each towed vehicle by using the measured yaw rate and the established delay value, measuring the actual yaw rate of the at least one towed vehicle, comparing the actual yaw rate with the desired yaw rate, and controlling the yaw rate of a towed vehicle to the desired yaw rate value by controlling steering axles and/or individual brakes on the at least one towed vehicle are comprised.

With the inventive method, a vehicle combination comprising at least one towed vehicle can be stabilized. The proportional factor of the yaw rate can be selected but is advantageously close to one.

BRIEF DESCRIPTION OF DRAWINGS

The invention will be described in greater detail in the following, with reference to the attached drawings, in which.

DETAILED DESCRIPTION

The embodiments of the invention with further developments described in the following are to be regarded only as examples and are in no way to limit the scope of the protection provided by the patent claims. The arrangement is suitable for all kinds of vehicle combinations comprising at least one towed vehicle, but is especially suitable for heavy vehicles such as trucks towing two or more trailers, since vehicle combinations having more towed vehicles tend to be more unstable than vehicle combinations having one or a few towed vehicles.

Figure 1:
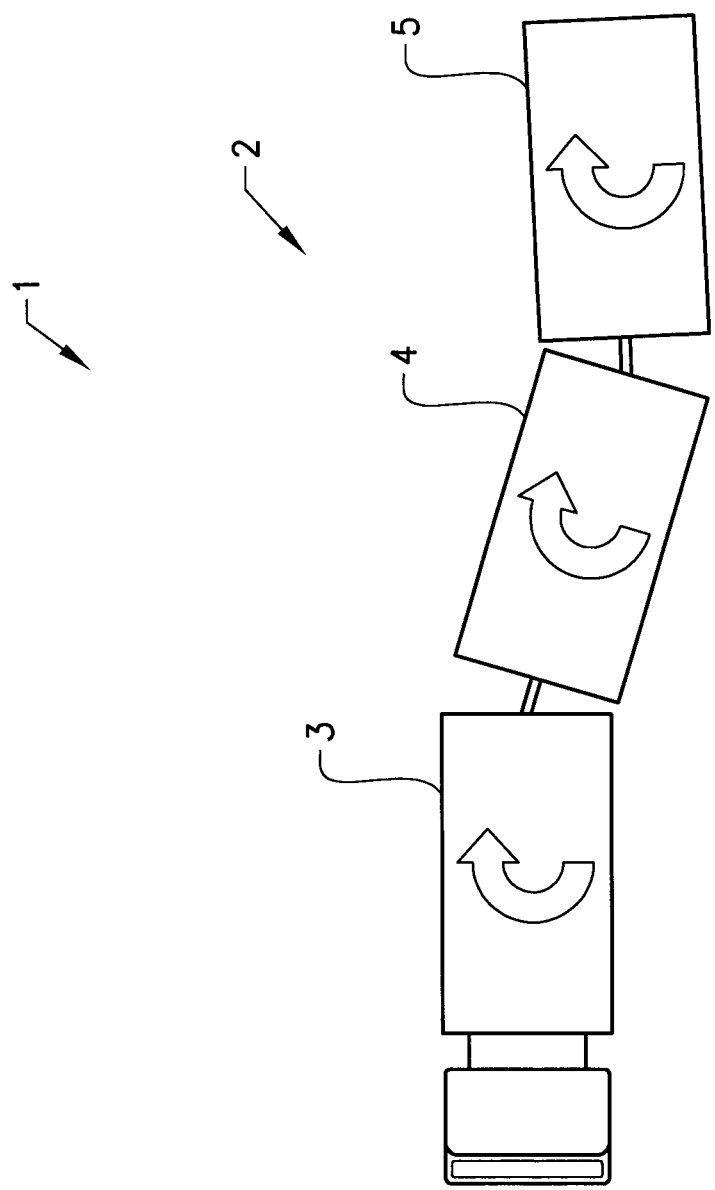
FIG. 1 shows a schematic vehicle combination comprising a towing vehicle and two towed vehicles

FIG. 1 shows a schematic vehicle combination 2 comprising a towing vehicle 3 and two towed vehicles 4, 5. The towing vehicle is a regular truck or tractor adapted for commercial highway use. A towed vehicle may be a drawbar trailer having both front and rear axles. A towed vehicle may also be a semi-trailer having only rear axles in combination with a dolly. Different combinations of such trailers or semi-trailers pulled by either a truck or a tractor can be comprised in a vehicle combination. The yaw rate of each vehicle is indicated by a dashed arrow.

For long combinations comprising several towed vehicles, the maximum yaw rate is in general higher for the towed vehicles in a dynamic maneuver and is often higher at the most rearward towed vehicle. This can be seen when a vehicle combination comprising a truck with a dolly and semitrailer performs a lane-change on a highway. Cars nearby can find it dangerous when the trailers start swinging. The rearmost towed vehicle will show the largest sideway deviation during the maneuver. This effect is known as rearward amplification. The rearward amplification is defined as the ratio of the maximum yaw rate between the towing vehicle and the towed unit, i.e. each towed vehicle.

On a vehicle combination adapted for the inventive arrangement, all towed vehicles should be equipped with actuators in the form of either individually controlled brakes or an actively controlled steering. Preferably, each axle of a towed vehicle is provided with either individually controlled brakes or an actively controlled steering. Depending on the number of axles on a towed vehicle, it is also possible that less than all axles are provided with either individually controlled brakes or an actively controlled steering. As an example, a towed vehicle having three axles may have two steered axles. The number of steered axles or individually braked axles is used as an input to the vehicle combination model.

In the inventive arrangement, the control strategy is to utilize the actuators such that the yaw rates of the towed vehicles are equal or close to equal to the measured yaw rate of the towing vehicle except for a delay. It is also possible to set the rearward amplification to a selected constant level close to one, and preferably lower than 1.5. In the arrangement, the actual measured yaw rate of each towed vehicle is compared at each time step to this reference. The momentary yaw rate of the towing vehicle at each time step is thus not used as a reference for the arrangement in order to control the stability of the vehicle combination.

In the arrangement and the method, the following steps are comprised in the control approach. First, a desired delay between the yaw rate of the towing vehicle and the yaw rate of each towed vehicle is calculated. This calculation is done by using a vehicle combination model which may have wheel speed, friction between road and tires, vehicle combination properties such as weight and length, steering frequency and steering angle as input values.

When a desired delay value for each towed vehicle is calculated, the actual yaw rate for the towing vehicle is determined. The actual yaw rate can be determined either by measuring the actual yaw rate with a yaw rate sensor or by estimating the actual yaw rate by using other vehicle properties such as vehicle speed and steering angle.

A reference yaw rate value is then obtained for each towed vehicle by using the actual yaw rate of the towing vehicle together with the desired delay value for each towed vehicle. The reference yaw rate value for each towed vehicle is then compared with an actual yaw rate value for each towed vehicle and the actuators are controlled such that the actual yaw rate of the towed vehicle follows the reference yaw rate value. The actual yaw rate for a towed vehicle may also be obtained either by measuring the yaw rate with a yaw rate sensor or by estimating a yaw rate value by using other properties.

The actuators of each towed vehicle are controlled by a control unit such that the yaw rate of the towed vehicles follows the reference yaw rate value. If the actuators are wheel brakes, the wheel brakes are controlled such that the wheel brakes will help the towed vehicle to follow the track of the towing vehicle. If the vehicle combination makes a lane change, the lane change will cause the towed vehicles to make a tail swing out. The tail swing out can be prevented or minimized by actuating the brakes on one side of the towed vehicles more than the brakes on the other side, e.g. the brakes on the right side of the towed vehicle are actuated more than the brakes on the left side. If the actuators are steered axles, the wheels will be steered somewhat in the opposite direction of the lane change direction, in order to follow the reference yaw rate value. The control unit may be a stand-alone control unit or it may be integrated in an existing control unit, such as in the brake control unit.

One example of a common vehicle combination used on some markets is a truck with a dolly and a semi-trailer system. The dolly is commonly provided with two axles and the semi-trailer is commonly provided with three axles. By fitting actively steered axles on the dolly and the semitrailer and by controlling them with the inventive arrangement and method, a stability improvement of around 40% or more may be obtained during a lane change maneuver compared to the same combination having non-steered axles. The same result may be obtained by providing the dolly and the semi-trailer with individually controllable wheel brakes.

Figure 2A:
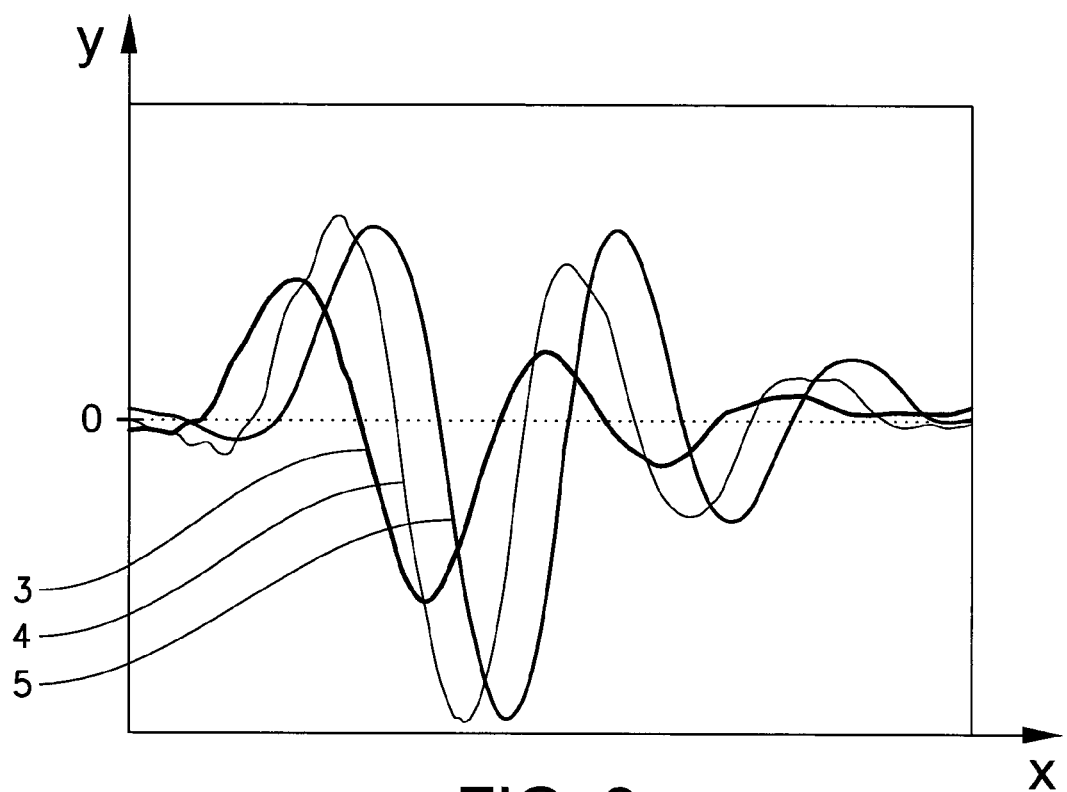
FIG. 2a shows an example of a yaw rate behaviour for a vehicle combination without an inventive arrangement for stabilizing a vehicle combination.

An example of measurements for such a vehicle combination is shown in FIG. 2. The x-axis shows time and the y-axis shows yaw rate. Curve 3 shows the yaw rate of the truck, curve 4 shows the yaw rate of the dolly and curve 5 shows the yaw rate of the semi-trailer. FIG. 2a shows the behaviour of a conventional vehicle combination without individually controllable brakes or actively steered axles. For this vehicle combination, the rearward amplification is significantly greater than one, and is in the range above 1.5, and there is no substantial damping of the second oscillation.

Figure 2B:
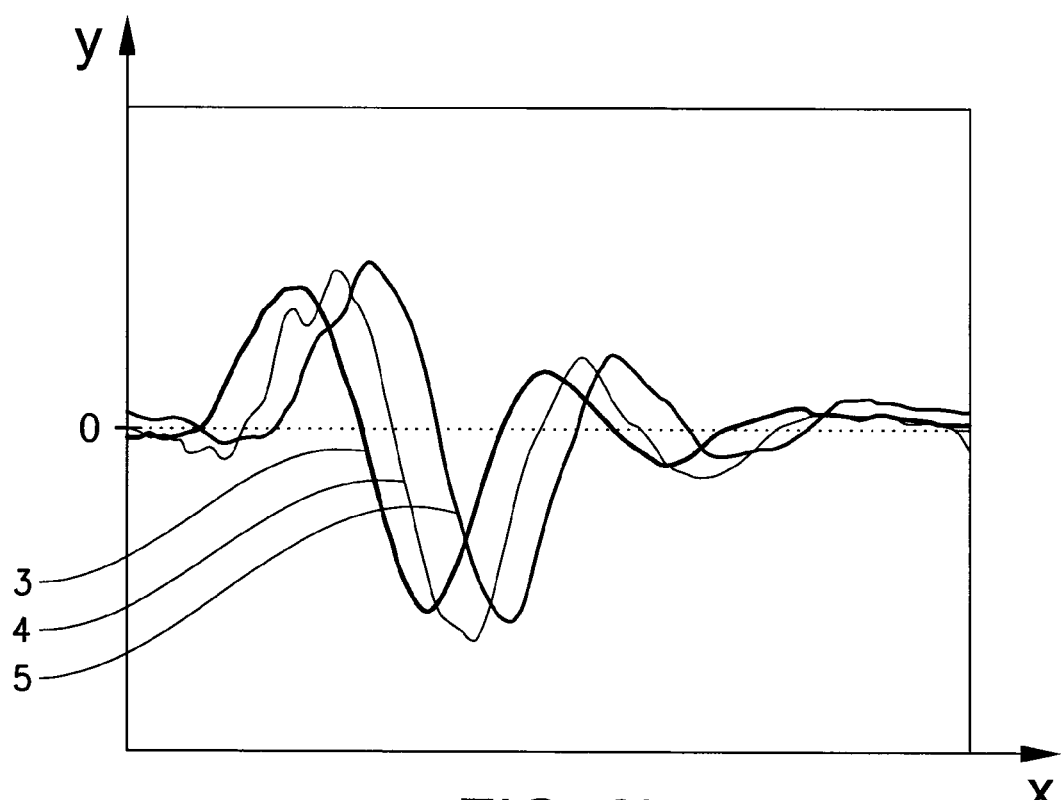
FIG. 2b shows an example of a yaw rate behaviour for a vehicle combination with an inventive arrangement for stabilizing a vehicle combination.

In FIG. 2b, the behaviour of a vehicle combination having either individually controlled brakes or actively steered axles is shown. Here, the rearward amplification is close to one and there is a substantial damping of the yaw rate.

In the inventive arrangement, the behaviour of the vehicle combination can be predicted by using a vehicle combination model. In this way, the control of the towed vehicles can be more preventative which means that less control input energy for the brakes or steering is required for the stabilization of the vehicle combination. The stabilization is also faster and the damping of the system is improved.

The arrangement is suitable for vehicle combinations having at least one towed vehicle. The arrangement is however preferably used for vehicle combinations having at least two towed vehicles. In the example described above, a vehicle combination having two towed vehicles is described. By using a vehicle combination model adapted for the number of towed vehicles, the arrangement can be used to stabilize vehicle combinations having three and more towed vehicles. For a vehicle combination having three towed vehicles, three delay values will be used together with the determined yaw rate of the towing vehicle to stabilize the vehicle combination.

In a development of the inventive arrangement, only the most rearward towed vehicle is used to stabilize the vehicle combination. In one example, the vehicle combination comprises a truck, a dolly and a semi-trailer. Here, only the semi-trailer will be used to stabilize the vehicle combination. In this case, the desired delay value is established between the truck and the semi-trailer. The actual yaw rate for the truck is then determined. A reference yaw rate value for the semi-trailer is then obtained from the actual yaw rate of the truck and the desired delay value. The actuators of the semi-trailer are then controlled by the control unit such that the actual yaw rate of the semi-trailer follows the reference yaw rate value. The control unit sends control signals to the steering axles and/or the individually controlled brakes of the semi-trailer. Depending on the types of the different towed vehicles contained in the vehicle combination, it is possible to obtain delay values for only some of the towed vehicles. Preferably, towed vehicles at the rear of the vehicle combination are used to stabilize the vehicle combination.

Figure 3:
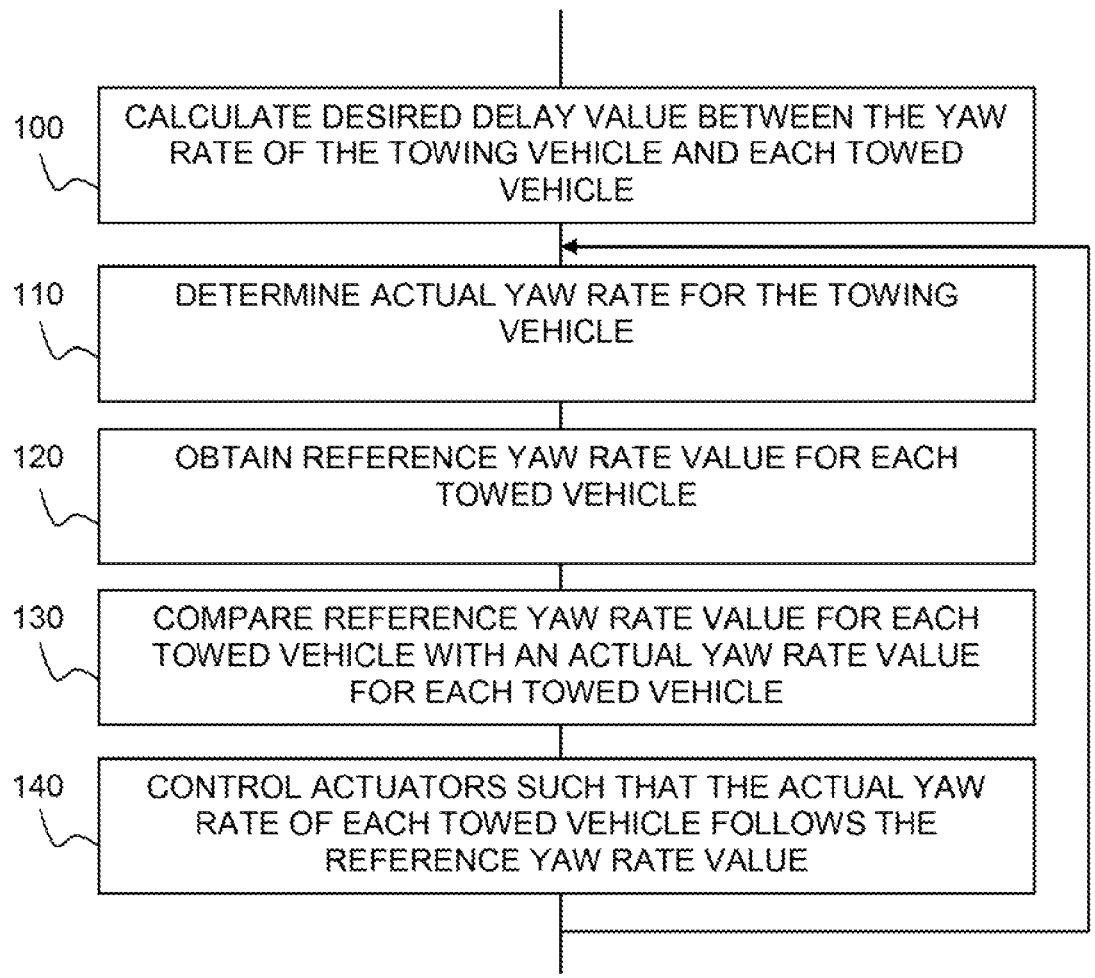
FIG. 3 shows a schematic flow chart of an inventive method for stabilizing a vehicle combination.

FIG. 3 shows a schematic flow chart of a method for method for stabilizing a vehicle combination comprising a towing vehicle and at least one towed vehicle.

In step 100, a desired delay value between the yaw rate of the towing vehicle and each towed vehicle is calculated. This calculation is done by using a vehicle combination model which may have wheel speed, friction between road and tires, vehicle properties such as weight and length, steering frequency and steering angle as input values. One individual delay value for each towed vehicle is calculated.

In step 110, the actual yaw rate for the towing vehicle is determined. The actual yaw rate can be determined either by measuring the actual yaw rate with a yaw rate sensor or by estimating the actual yaw rate by using other vehicle properties such as wheel speed and steering angle.

In step 120, a reference yaw rate value is obtained for each towed vehicle by using the actual yaw rate of the towing vehicle together with the desired delay value for each towed vehicle. The reference yaw rate value will be used to control the yaw rate of each towed vehicle.

In step 130, a reference yaw rate value for each towed vehicle is then compared with an actual yaw rate value for each towed vehicle. The actual yaw rate for a towed vehicle may be obtained either by measuring the yaw rate with a yaw rate sensor or by estimating a yaw rate value by using other properties. When the actual yaw rate value for a towed vehicle differs from the reference yaw rate value by a predefined threshold value, the control unit of the arrangement will compensate for this difference. It is possible to use a deadband around the reference yaw rate in order to avoid oscillations when the vehicle travels straight. The deadband width may either be an absolute value or may be dependent on the value of the reference yaw rate.

In step 140, the actuators are controlled by the control unit such that the actual yaw rate of each towed vehicle follows the reference yaw rate value. The control unit sends control signals to the steering axles and/or the individually controlled brakes on each towed vehicle.

The steps 110 to 140 are then repeated until the maneuver of the vehicle combination is completed. The desired delay values for each towed vehicle is preferably updated when the vehicle properties changes, such that the when the load of the vehicle combination changes. If the number of vehicles in the vehicle combination changes, a new vehicle combination model is required, which also mean that the desired delay values are recalculated.

The invention is not to be regarded as being limited to the embodiments described above, a number of additional variants and modifications being possible within the scope of the subsequent patent claims.

REFERENCE SIGNS

1: Arrangement
2: Vehicle combination
3: Towing vehicle
4: First towed vehicle
5: Second towed vehicle

The invention claimed is:

1. An arrangement for improving stability of a vehicle combination comprising a towing vehicle and at least one towed vehicle, where the at least one towed vehicle comprises at least one actively steered axle and/or an individually controlled wheel brake on at least one axle, where the towing vehicle and the at least one towed vehicle each comprises a yaw rate determining means for determining yaw rate of the towing vehicle and the at least one towed vehicle, the yaw rate determining means being a yaw sensor, where the arrangement further comprises a vehicle combination model adapted for determining a desired delay value between the yaw rate of the towing vehicle and the yaw rate of the at least one towed vehicle, the arrangement is adapted to stabilize the at least one towed vehicle by using the determined yaw rate of the towing vehicle and the desired delay value for the at least one towed vehicle to establish a reference yaw rate for the at least one towed vehicle, and to control the steered axle and/or the individually controlled brake of the at least one towed vehicle such that the determined yaw rate of the at least one towed vehicle corresponds to the reference yaw rate of the at least one towed vehicle.

2. Arrangement according to claim 1, wherein an amplitude of the reference yaw rate of the at least one towed vehicle and an amplitude of the determined yaw rate of the towing vehicle are proportional.

3. Arrangement according to claim 1, wherein the arrangement is adapted to improve the stability for a vehicle combination comprising the towing vehicle and two towed vehicles, where each towed vehicle comprises yaw rate determining means for determining the yaw rate of respective towed vehicle, where the vehicle combination model is adapted for determining the desired delay value between the yaw rate of the towing vehicle and the yaw rate of each towed vehicle, wherein the arrangement is adapted to stabilize each towed vehicle by using the determined yaw rate of the towing vehicle and the desired delay value for respective towed vehicle to establish the reference yaw rate for each towed vehicle, and to control the steered axle and/or the individually controlled brake of each towed vehicle such that the determined yaw rate of each towed vehicle corresponds to the reference yaw rate of each towed vehicle.

4. Arrangement according to claim 1, wherein a deadband is used, when comparing the determined yaw rate to the reference yaw rate of the towed vehicle.

5. Arrangement according to claim 4, wherein a deadband width of the deadband is absolute.

6. Arrangement according to claim 4, wherein a deadband width of the deadband is dependent on the value of the reference yaw rate.

7. Arrangement according to claim 1, wherein the vehicle combination model is implemented in a control unit in a vehicle control system.

8. Vehicle combination comprising an arrangement for improving stability of the vehicle combination comprising a towing vehicle and at least one towed vehicle, where the at least one towed vehicle comprises at least one actively steered axle and/or an individually controlled wheel brake on at least one axle, where the towing vehicle and the at least one towed vehicle each comprises a yaw rate determining means for determining yaw rate of the towing vehicle and the at least one towed vehicle, the yaw rate determining means being a yaw sensor, where the arrangement further comprises a vehicle combination model adapted for determining a desired delay value between the yaw rate of the towing vehicle and the yaw rate of the at least one towed vehicle, the arrangement is adapted to stabilize the at least one towed vehicle by using the determined yaw rate of the towing vehicle and the desired delay value for the at least one towed vehicle to establish a reference yaw rate for the at least one towed vehicle, and to control the steered axle and/or the individually controlled brake of the at least one towed vehicle such that the determined yaw rate of the at least one towed vehicle corresponds to the reference yaw rate of the at least one towed vehicle.

9. Vehicle according to claim 8, the at least one towed vehicle comprises a dolly and a semi-trailer.

10. Vehicle according to claim 8, wherein the at least one towed vehicle comprises at least one drawbar trailer.

11. Vehicle according to claim 8, wherein the at least one towed vehicle is a dolly or a semi-trailer.

12. A method for stabilizing a vehicle combination comprising a towing vehicle and at least one towed vehicle, comprising the following steps:
 establishing a desired delay value for yaw rate between the towing vehicle and the at least one towed vehicle in the vehicle combination by using a vehicle combination model,
 determining yaw rate of the towing vehicle,
 establishing a reference yaw rate value for each towed vehicle by using the determined yaw rate of the towing vehicle and the established delay value,
 determining an actual yaw rate of the at least one towed vehicle,
 comparing the actual yaw rate with the reference yaw rate,
 controlling the yaw rate of the at least one towed vehicle to the reference yaw rate value by controlling steering axles and/or individual brakes on the at least one towed vehicle.

13. A computer comprising a program for performing, when the program is run on the computer, a method for stabilizing a vehicle combination comprising a towing vehicle and at least one towed vehicle, the method comprising the following steps:

establishing a desired delay value for yaw rate between the towing vehicle and the at least one towed vehicle in the vehicle combination by using a vehicle combination model, determining yaw rate of the towing vehicle, establishing a reference yaw rate value for each towed vehicle by using the determined yaw rate of the towing vehicle and the established delay value, determining an actual yaw rate of the at least one towed vehicle, comparing the actual yaw rate with the reference yaw rate, controlling the yaw rate of the at least one towed vehicle to the reference yaw rate value by controlling steering axles and/or individual brakes on the at least one towed vehicle.

14. A computer program product comprising a program stored on a non-transitory computer readable medium for performing, when the program product is run on a computer, a method for stabilizing a vehicle combination comprising a towing vehicle and at least one towed vehicle, the method comprising the following steps:

establishing a desired delay value for yaw rate between the towing vehicle and the at least one towed vehicle in the vehicle combination by using a vehicle combination model, determining yaw rate of the towing vehicle, establishing a reference yaw rate value for each towed vehicle by using the determined yaw rate of the towing vehicle and the established delay value, determining an actual yaw rate of the at least one towed vehicle, comparing the actual yaw rate with the reference yaw rate, controlling the yaw rate of the at least one towed vehicle to the reference yaw rate value by controlling steering axles and/or individual brakes on the at least one towed vehicle.

15. An arrangement for improving stability of a vehicle combination comprising a towing vehicle and at least one towed vehicle, where the at least one towed vehicle comprises at least one actively steered axle and/or an individually controlled wheel brake on at least one axle, where the towing vehicle and the at least one towed vehicle each comprises a yaw rate determining means for determining yaw rate of the towing vehicle and the at least one towed vehicle, the yaw rate determining means being a software module in a control unit, where the arrangement further comprises a vehicle combination model adapted for determining a desired delay value between the yaw rate of the towing vehicle and the yaw rate of the at least one towed vehicle, the arrangement is adapted to stabilize the at least one towed vehicle by using the determined yaw rate of the towing vehicle and the desired delay value for the at least one towed vehicle to establish a reference yaw rate for the at least one towed vehicle, and to control the steered axle and/or the individually controlled brake of the at least one towed vehicle such that the determined yaw rate of the at least one towed vehicle corresponds to the reference yaw rate of the at least one towed vehicle.

* * * * *